United States Patent [19]
Yamada

[11] Patent Number: 6,081,908
[45] Date of Patent: Jun. 27, 2000

[54] TEST METHOD OF ONE CHIP MICRO-COMPUTER AND ONE CHIP MICRO-COMPUTER FOR CONDUCTING THE TEST

[75] Inventor: Yasuo Yamada, Chiba, Japan

[73] Assignee: Kawasaki Steel Corporation, Kobe, Japan

[21] Appl. No.: 09/015,400

[22] Filed: Jan. 29, 1998

[30] Foreign Application Priority Data

Jan. 31, 1997 [JP] Japan ................................. 9-018467

[51] Int. Cl.⁷ .................................................. C06F 11/00
[52] U.S. Cl. ............................................................ 714/30
[58] Field of Search ........................ 380/2, 3, 4; 714/30, 714/25, 27, 732

[56] References Cited

U.S. PATENT DOCUMENTS

| | | | |
|---|---|---|---|
| 5,228,139 | 7/1993 | Miwa et al. | 714/30 |
| 5,671,275 | 9/1997 | Ezuriko | 380/4 |
| 5,704,033 | 12/1997 | Park | 714/30 |
| 5,784,589 | 7/1998 | Bluhm | 395/393 |
| 6,003,141 | 12/1999 | Ishida | 714/30 |

FOREIGN PATENT DOCUMENTS

| | | |
|---|---|---|
| 3-256122 | 11/1991 | Japan . |
| 4-304540 | 10/1992 | Japan . |

*Primary Examiner*—Robert W. Beausoliel, Jr.
*Assistant Examiner*—James G. Weir
*Attorney, Agent, or Firm*—Oliff & Berridge, PLC

[57] ABSTRACT

When testing internal state of one chip micro-computer having a CPU and a ROM installed in a single package, data D read from the ROM is subjected to non-degenerate conversion using data DT from the outside and is executed as a command code by the CPU in a test mode. To input the data DT which can serve as a correct command code from the outside, it is necessary that the data D is known. A third party is incapable of conducting a test for testing the internal state and wrongfully reading the written data.

5 Claims, 9 Drawing Sheets

TEST METHOD OF ONE CHIP MICRO-COMPUTER AND ONE CHIP MICRO-COMPUTER FOR CONDUCTING THE TEST

BACKGROUND OF THE INVENTION

1. Field of the Invention

The present invention relates to a test method of one chip micro-computer for testing internal state of the one chip micro-computer having at least a CPU and a ROM installed in a single package, the ROM connected to the CPU such that the written data of the ROM can be executed by the CPU as a command code, and relates to one chip micro-computer for conducting the test. More particularly, the present invention relates to a test method of one chip micro-computer capable of testing (including a ROM test), no matter when, the internal state of one chip micro-computer which is the target of the present invention while preventing the third party from wrongfully reading the data of the ROM only by adding relatively simple circuits.

2. Description of the Related Art

Conventionally, there has been provided one chip micro-computer (to be referred to as MCU (Micro Controller Unit) hereinafter) having a CPU and a ROM (Read Only Memory), connected to the CPU such that the written data of the ROM can be executed by the CPU as a command code, installed in a single semiconductor chip or a substrate of various type, that is, installed in a single package. The shipping test for an installed ROM is indispensable for such an MCU. It is also necessary to conduct a test (to be referred to as a ROM test hereinafter) for confirming whether or not written data is the same as is written. Due to this, a function to read the data written in the installed ROM to the outside of the MCU is required.

However, if this function is given, there is a possibility that a third party wrongfully reads the written data. To prevent this, as described below, conventionally, restrictions are placed on the reading of written data or written data is indirectly tested without directly reading the written data.

(A1) A non-reversible physical modification is made to the MCU to prevent written data from being read after shipping the MCU. The non-reversible physical modification includes, for example, disconnection of a security fuse.

(A2) Procedures for reading written data are made to be complex or difficult so as to reduce the possibility for any third party to wrongfully read the data. Normally, this is, for example, setting a test mode for a ROM test only when a certain combination of input values of a plurality of certain terminals is given and permitting reading the data. The combination of input values includes an order combination. Japanese Unexamined Patent Publication No. 4-304540 also teaches allowing for the reading of written data if the data written in the installed ROM is compared with reference data from outside and they coincide with each other.

(A3) At the time of testing written data in the installed ROM, the test of judging whether or not the written data is correct is conducted within the MCU without outputting the data to the outside of the MCU and only the judge result is outputted to the outside. This includes, for example, a case of generating the check sum of the test target written data, comparing it to an expected value, judging whether the written data is correct or incorrect and outputting the judge result to the outside.

(A4) As shown in Japanese Unexamined Patent Publication No. 4-304540, permission for reading out data in an EPROM (Erasable and Programmable Read Only Memory) cell array to outside is given only when data inputted with write signal and data from the EPROM cell array are coincided with each other. Therefore, the data in the EPROM cell array is made to be a permission key for reading out the data.

(A5) Japanese Unexamined Patent Publication No. 3-256122 discloses one chip micro-computer which can use an external ROM. Namely, after release of reset, it is judged whether a reset vector which is inputted from outside coincides with a data of the same bit length. If they do not coincide with each other, a single chip mode is set by force. In the single chip mode, MCU operates according to a program installed in an internal ROM. Therefore, wrongful read out of the internal ROM using the external ROM illegally is prevented by setting the single chip mode by force.

The MCU is characterized in that processing having a high degree of freedom can be conducted depending of the program executed by the CPU. However, the prior art A1 to A5 mentioned above do hardly make use of this character. There are some cases where the CPU is not at all made use of during the ROM test and is kept in an inactive state. The prior art A1 to A5 also have the following problems, respectively.

As regards A1, even if there is a suspicion that written data in the installed ROM is defective after shipment, it has a fatal disadvantage in that another ROM test cannot be conducted once the non-reversible physical modification has been made. Furthermore, due to the necessity of special processing of a non-reversible physical modification such as the disconnection of a security fuse after a shipping test, test costs are disadvantageously increased. This is particularly disadvantageous to ASIC (or Application Specific Integrated Circuits) having many types but with small amounts.

As regards A2, whether or not any third party wrongfully reads the data depends on the number of terminals or procedures for use in read operation as described above. There is thus a limit to the security; i.e., the prevention of wrongful reading by the third party. Take an MCU of 100 pins, for example. Normally, so many terminals cannot be used for setting a ROM test mode and therefore a combination of so many input values cannot be conditioned. Since those skilled in the art could have estimated such a combination to a certain extent, there is a possibility that they can succeed in wrongfully reading data after lots of combinations are tried using a high-speed, general purpose integrated circuit tester. Moreover, to improve the security to prevent the wrongfully reading and to ensure the defense against it, a lot of terminals, pins and components are required, resulting in a cost hike. Even if such a defense is ensured, it produces no effect at all once the mechanism is revealed.

Moreover, the prior art A2 has a disadvantage to, for example, MCUs having the same hardware configuration but different from one another in data written in installed ROMs in accordance with purposes of parties who make orders. In this case, the fact that procedures of reading written data in the installed ROMs are the same makes it disadvantageously possible that persons responsible for orders wrongfully read data written in the installed ROMs of others. This occurs in particular to MCUs which are popular and used by a lot of people. That is, it is feared that the security mechanism of the MCU is revealed to a lot of users, with the result that it virtually loses its value.

As regards A3, it has a disadvantage in that there is a limit to test methods and there is a chance that check sums or the like coincide with one another. To reduce the possibility of the coincidence of the check sums, complex check sums are required. To realize it, however, many components are required and costs increase greatly. Furthermore, only the judge results of whether or not defective data exists are outputted to the outside of the MCU and it is impossible to know which written data is defective in the installed ROM or the like. This makes failure analysis disadvantageously difficult.

As regards A4 and A5, it has a disadvantage in that the permission key for reading out the data in the EPROM cell array or setting a single chip mode comprises only one or several byte. Therefore, the permission key may be comprehensively prepared and tried.

For example in A4, although internal data is changed by external data when both data do not coincide with each other, many data may be prepared and tried all. Therefore, security against wrongful read out may not be enough. Further, it seems that writing of known data is permitted all the time. Therefore, wrongful read out may be possible if the third party gives data which coincides with data written by himself.

SUMMARY OF THE INVENTION

The present invention has been made to solve the above-stated conventional problems. It is therefore an object of the present invention to make it possible to conduct a test for testing, no matter when, internal state, including the content of data written in a ROM of one chip micro-computer which is the very target of the present invention while preventing the third party from wrongfully reading the data of internal ROM only by adding relatively simple circuits.

The first invention of the present application solves the above problems by providing a test method of one chip micro-computer for testing internal state of one chip micro-computer having at least a CPU and a ROM installed in a single package, the ROM connected to the CPU, data written in the ROM capable of being executed by the CPU as a command code, the method comprising the steps of: setting a test mode for testing the internal state; executing a command code non-degenerately converted by data inputted from outside of the package when reading the command code from the ROM and executing the command code by the CPU; and detecting a CPU execution state from the outside of the package to thereby conduct the test.

In this invention, the word "non-degenerate" means that information quantity before and after conversion does not change, namely, one to one correspondence is kept.

The second invention of the present application can solve the above-stated problems by providing one chip micro-computer having at least a CPU and a ROM installed in a single package, the ROM connected to the CPU, data written in the ROM capable of being executed by the CPU as a command code, the one chip micro-computer comprising: a test mode setting circuit for setting a test mode for testing internal state of the one chip micro-computer; a conversion data input terminal for inputting test conversion data from outside of the package; a data conversion operating circuit for non-degenerate converting the command code using the test conversion data when the test mode has been set and the command code is read from the ROM and executed by the CPU; and execution state detection means for detecting an execution state of the CPU executing a non-degenerately converted command code outputted from the data conversion operating circuit, wherein the test is conducted by the observation.

Moreover, according to the second invention of the present application, the data conversion operating circuit includes a circuit for non-degenerate converting the command code by conducting an EXCLUSIVE-OR operation between the command code and the test conversion data, thereby making it possible to conduct the non-regenerate conversion with a relatively simple circuit configuration.

The third invention of the present application can solve the above-stated problems by providing a test method of one chip micro-computer for testing internal state of one chip micro-computer having at least a CPU and a ROM installed in a single package, the ROM connected to the CPU, data written in the ROM capable of being executed by the CPU as a command code, said method comprising the steps of: setting a test mode for testing the internal state from outside of the one chip micro-computer; setting a block test mode for determining valid or invalid of operation of at least said CPU according to setting data in a mode register written by a program executed by the CPU; and operating said CPU to write desired setting data into the mode register, by a program of command code non-degenerate converted by data inputted from outside of package, when the test mode is set, said command code is read out of said ROM and executed by said CPU; whereby valid or invalid of partial operation of the one chip micro-computer is set.

The fourth invention of the present application can solve the above-stated problems by providing one chip micro-computer having at least a CPU and a ROM installed in a single package, said ROM connected to the CPU, data written in the ROM capable of being executed by the CPU as a command code, said one chip micro-computer comprising: a block test mode setting circuit with a mode register, for setting valid or invalid of operation of at least said CPU according to setting data in the mode register written by a program executed by the CPU; a test mode setting circuit for setting a test mode from outside of the one chip micro-computer; a conversion data input terminal for inputting test conversion data from outside of said package; and a data conversion operating circuit for non-degenerate converting the command code using said test conversion data when said test mode has been set and said command code is read from said ROM and executed by said CPU, wherein said CPU writes the setting data into the mode register by a program of the command code non-degenerate converted, and valid or invalid of partial operation of the one chip micro-computer is set.

The present invention aims not only ROM test but also various internal state of one chip micro-computer according to the present invention.

Here, functions of the present invention will be briefly described in case of ROM test, for example.

Figure 1:
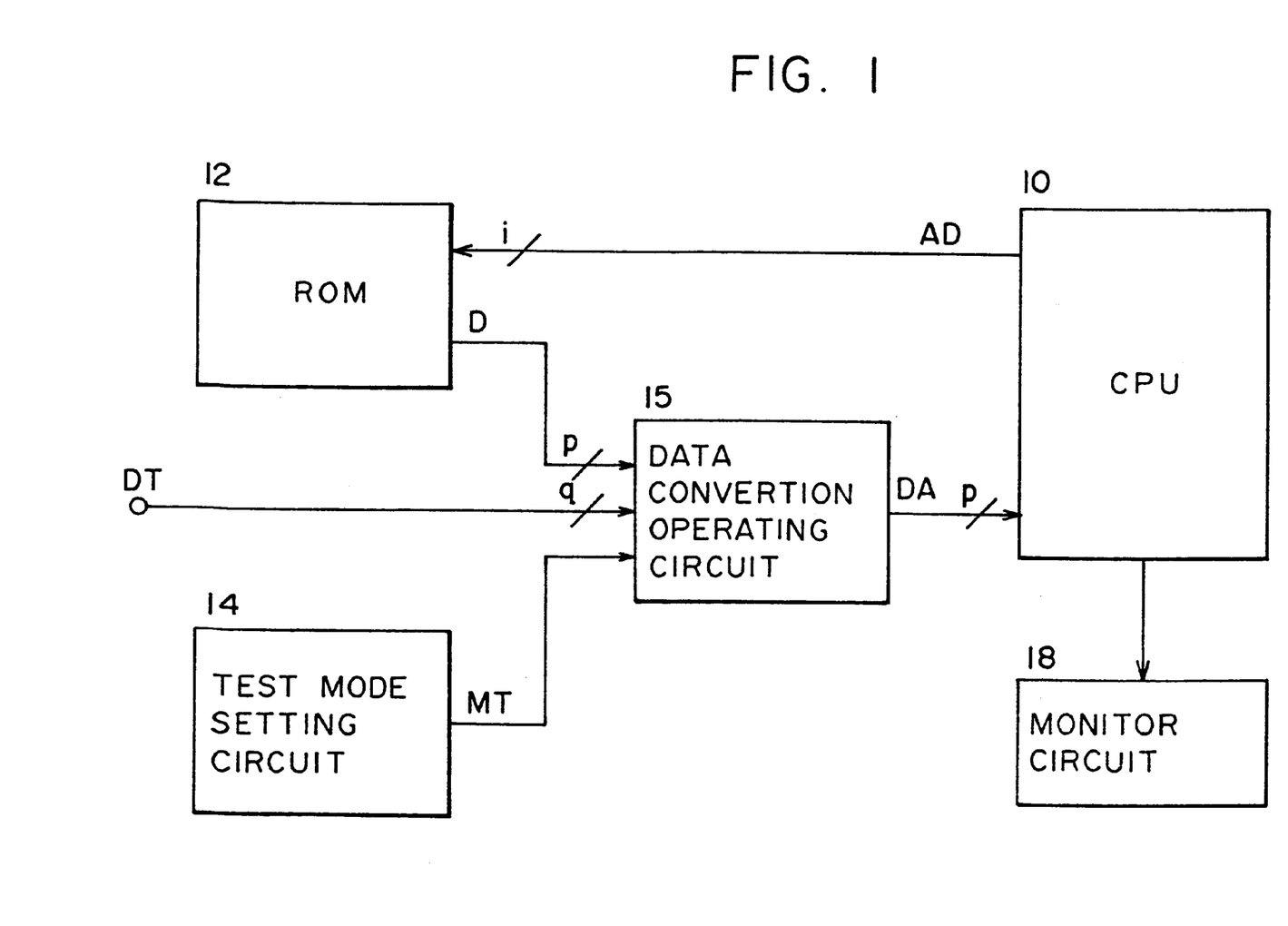
FIG. 1 is a block diagram showing the fundamental structure of the MCU which is the target of the present invention.

FIG. 1 is a block diagram showing the fundamental structure of the present invention. Description of the present invention will be given referring to this figure.

The present invention is based on the MCU having a CPU 10 and a ROM 12 installed in a single package. The ROM 12 is connected to the CPU 10 so that the written data of the ROM 12 can be executed by the CPU 10 as a command code. The present invention is based on an internal state test method for such an MCU.

In FIG. 1, a test mode setting circuit 14 is a circuit for setting an operation mode for testing internal state of MCU made into a single package. The operation mode is not limited to a ROM test. However, steps for testing data stored in the ROM 12 will be explained at first.

The MCU includes a conversion data input terminal for inputting test conversion data DT from the outside of the package. A data conversion operating circuit 15 is a circuit for non-degenerate converting a command code using the test conversion data DT when the test mode is set and the command code is read from the ROM 12 and executed by the CPU 10. In FIG. 1, reference symbols i, p and q denote the number of signal lines.

The non-degenerate conversion signifies converting n different types inputs into n different types outputs. In the present invention, n types of command codes outputted from the ROM 12 are converted into n types command codes to be executed by the CPU 10. The non-degenerate conversion can be conducted by means of an EXCLUSIVE-OR operation as shown in the embodiment to be described later. It is necessary to satisfy the relationship of p≦ (not greater than) q so that the result of this non-degenerate conversion can be completely set from the outside.

Next, a monitor circuit 18 is one embodiment of execution state detection means for detecting or observing the state of the CPU 10 executing the command code outputted from the data conversion operating circuit 15, from the outside of the package. The monitor circuit 18 may be an output port circuit for outputting a signal state to the outside of the package as shown in the embodiment to be described later. In this case, the execution state of the CPU 10 is outputted by the software of the CPU 10 itself.

According to the present invention described above, if a non-test mode is set, the data DA same as the data D written in the ROM 12 is read from the data conversion operating circuit 15 and executed by the CPU 10. On the other hand, if a test mode is set, the data D written in the ROM 12 is non-degenerate converted to the data DA, transferred to CPU 10 and executed by the CPU 10. Therefore, the person who knows the data written in the ROM 12 is capable of freely setting data DA serving as a command code to be executed by the CPU 10 by inputting test conversion data DT from outside for converting the known data D outputted from the ROM 12. In other words, the person is substantially capable of freely setting a program executed by the CPU from the outside of the MCU.

Accordingly, if the execution state of the CPU 10 is observed by using the program and the monitor circuit 18 from the outside of the MCU and the data written in the ROM 12 coincides with expected data, then command data is correctly converted and the CPU 10 executes an operation in accordance with a desired program after conversion and the person is capable of discriminating that the data written in the ROM 12 is correct by observing the operation from the outside. If the data written in the ROM 12 does not coincide with the expected data, a desired program cannot be obtained after conversion and the CPU 10 does not execute the operation in accordance with the program. As a result, the program, for example, malfunctions and an expected operation cannot be observed, thereby making it possible to discriminate failure.

As can be seen from the above, the present invention makes use of the character of the MCU having the CPU installed therein and actively makes use of the CPU by keeping the CPU in an active state while the ROM test is being conducted. During the ROM test, it can be said that a command code executed by the CPU is set by using test conversion data inputted from the outside of the MCU and that a program can be supplied from the outside. Due to this, even if procedures are made complex in an attempt to make it difficult for a third party to wrongfully read written data during the test for the written data in the ROM installed in the MCU, there occurs no cost increase for incorporating the mechanism into the MCU by hardware and preventive measures against the wrongful reading to a satisfactory degree by software. Therefore, according to the present invention, it is possible to test, no matter when, internal state, including the content of data written in the ROM, of one chip micro-computer which is the very target of the present invention while preventing the third party from wrongfully reading the data in the ROM only by adding relatively simple circuits.

Now, a example wherein a program for conducting a ROM test is stored in specific addresses of the ROM installed in the MCU will be described in comparison to the present invention. Namely, in the normal operation mode which is not a test mode for the ROM test, a program is executed from a specific address of the installed ROM, address 0 in many cases. On the other hand, in a ROM test mode, a test program is executed from an address different from those of the program in the normal operation mode.

This comparison example has, however, a disadvantage in that costs increase due to the incorporation of the ROM test program or in that the address area a user can use is narrowed. This is particularly conspicuous when a long program for a complex ROM test for ensuring the prevention of a third party from wrongfully reading the written data is installed. In addition, it has a critical problem that, since the test program is incorporated, it is feared that the third party wrongfully reads written data once he or she discovers at which address the test program starts. It is difficult for persons who order MCUs having the same hardware configuration but different written data in the ROM installed to keep individual written data confident.

The disadvantages of the comparison example described above never occur to the present invention. According to the present invention, as far as the test mode of a ROM test is concerned, if the data written in the ROM installed in the MCU is known and a command code to be executed by the CPU is determined, then the CPU is capable of executing a desired command code by inputting test conversion data corresponding to these two data from the outside. Therefore, if the data written in the ROM is known, a command code executed by the CPU can be set by test conversion data from the outside. Accordingly, a program executed by the CPU is set from the outside every time a ROM test is conducted, whereby the program is not used by a third party.

According to the present invention, a person who knows the data written in the ROM 12 can substantially set the program executed by the CPU 10 from outside of the MCU. The content of program is not restricted by the content of the ROM 12 and various programs may be set.

Further, there is a MCU, function or operating state of internal circuit thereof can be changed by the data written in the latch or register. For these MCU, too, test program for rewriting data within the latch or register from outside of the MCU, operating with various modifications and monitoring operating status from outside of the MCU may be set from outside of the MCU and executed. Therefore, various tests to internal state with regard to not only various types of memory, but also to various circuits, such as operating circuit or peripheral functioning circuit, installed within the MCU, may be conducted from outside.

In the third and fourth invention, valid or invalid of partial operation in the one chip micro-computer is set by the program of command code non-degenerately converted and executed by the CPU according to the first and second invention. Therefore, the one chip micro-computer can be tested in various operating conditions.

As described so far, according to the present invention, it is possible to test, no matter when, internal state, including the content of the data written in the ROM of the one chip micro-computer which is the very target of the present invention while preventing any third party from wrongfully reading the written data in internal ROM, only by adding relatively simple circuits. In the embodiment according to the present invention to be described later, for example, added hardware are only eight AND logic gates for a test mode setting circuit 14A and eight EXCLUSIVE-OR logic gates for a data conversion operating circuit 15A. Thus, with quite a small number of added hardware, the test to internal state of the MCU including the ROM test can be conducted while ensuring that the installed ROM data is prevented from being wrongfully read. Peripheral circuits normally provided by the MCU may be used as the means for detecting execution state of the CPU. Therefore, no additional hardware is necessary. Even if the test method is disclosed, it is possible to ensure the prevention of the wrongful reading of the written data by the third party.

BRIEF DESCRIPTION OF THE ACCOMPANYING DRAWINGS

The preferred embodiments will be described in detail with reference to the accompanying drawings, wherein like elements are denoted throughout the figures with like reference numerals, and wherein.

PREFERRED EMBODIMENTS OF THE INVENTION

The embodiment of the present invention will be described in detail with reference to the drawings.

Figure 2:
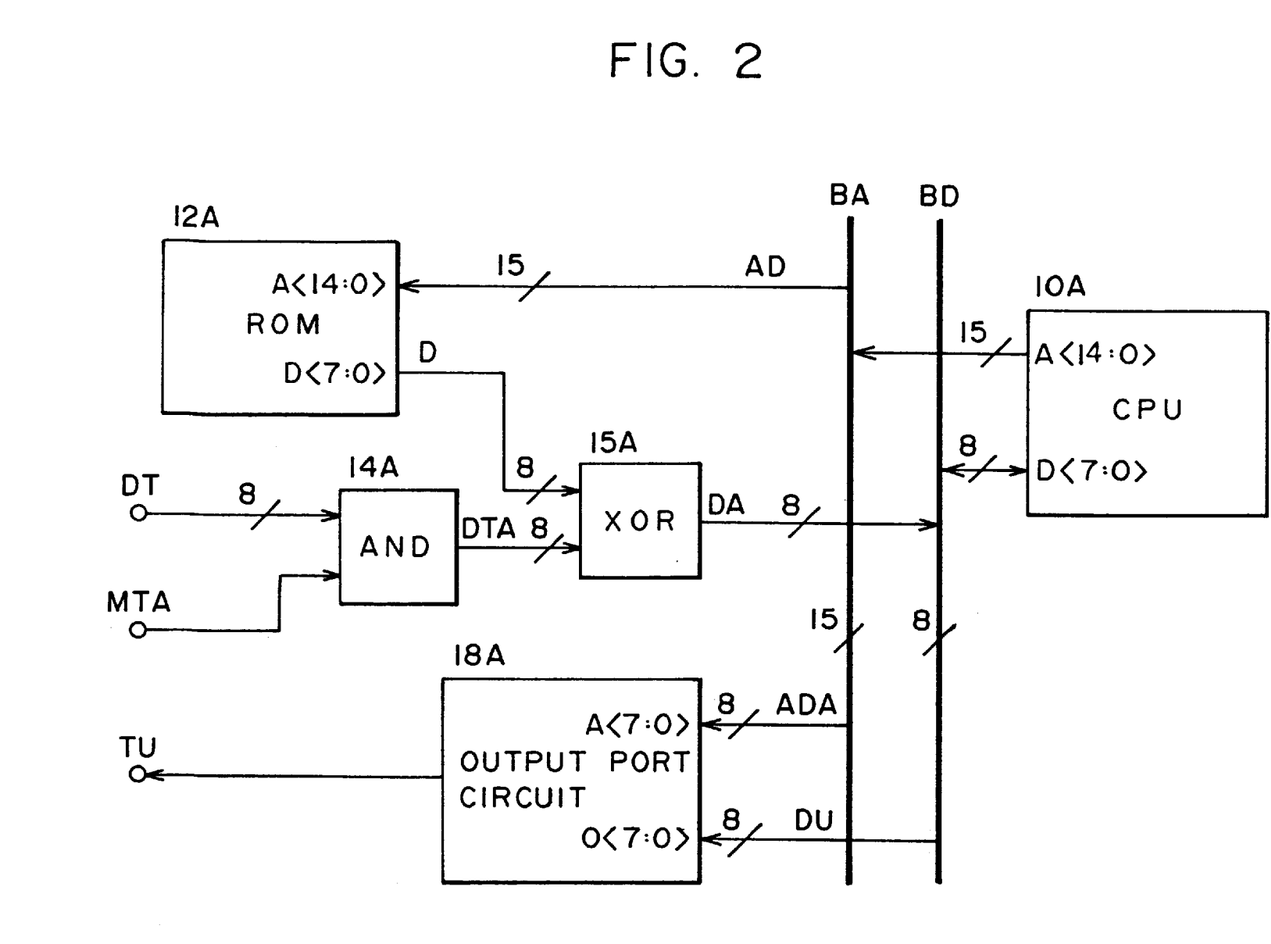
FIG. 2 is a block diagram showing the structure of the first embodiment of the MCU to which the present invention is applied.

FIG. 2 is a block diagram showing the structure of the first embodiment of the MCU to which the present invention is applied.

In this embodiment, a one-chip microcomputer is used as the MCU. As shown in FIG. 2, the MCU comprises a CPU 10A and a ROM 12A. Data written in the ROM 12A includes a program for a command code of the CPU 10A. The command code is executed by the CPU 10A through an address bus BA and a data bus BD. In addition, in this embodiment, the ROM test is aimed at testing the content of the data written in the ROM 12A.

In this embodiment, the MCU further comprises a test mode setting circuit 14A, a data conversion operating circuit 15A and an output port circuit 18A to conduct the ROM test.

A test mode signal MTA is inputted from the outside of the MCU into the test mode setting circuit 14A. The test mode signal MTA is in an H state in the ROM test mode and in an L state in the normal operation mode.

It is noted that the test mode signal MTA can be generated within the MCU. For example, it is possible to set a test mode by defining a combination of signal values of a plurality of terminals from the outside which is not normally used as a "test mode" from among combinations thereof to thereby generate the test mode signal MTA.

Figure 3:
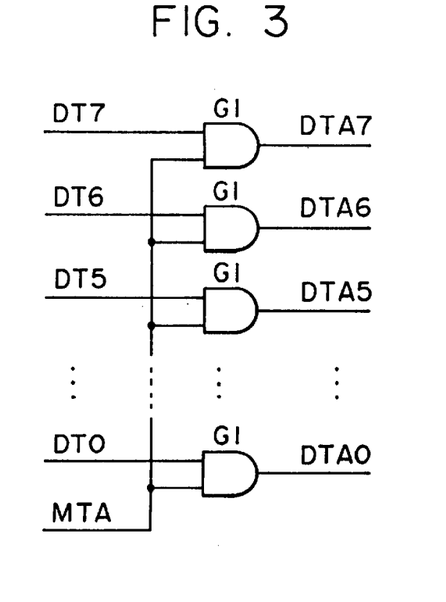
FIG. 3 is a circuit diagram of a test mode setting circuit used in the first embodiment.

The test mode setting circuit 14A has a structure in which in all eight logical AND gates G1 are used as shown in FIG. 3. A logical product operation is conducted for each of the eight bits of the test mode signal MTA and the test conversion data DT (to be referred to as data DT in brevity) inputted from the outside and the results are outputted as 8 bit data DTA. Therefore, in the test mode setting circuit 14A, the data DTA are all "0" in the normal operation mode, that is, the DTA0 to DTA7 are all "0". Meanwhile, the data DTA are the same as the data DT in the test mode.

Figure 4:
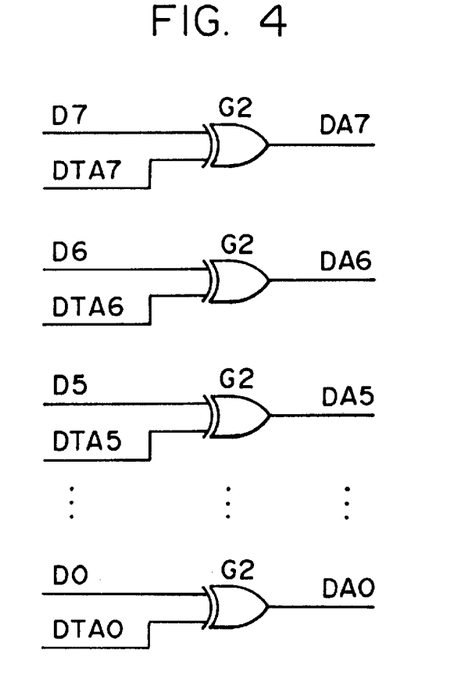
FIG. 4 is a circuit diagram of a first example of a data conversion operating circuit used in the embodiment.

Next, the data conversion operating circuit 15A has a structure in which in all eight logical EXCLUSIVE-OR gates G2 are used. Logical EXCLUSIVE-OR operations are conducted for the same bit data between eight-bit data D from the ROM 12A and eight-bit data DTA from the test mode setting circuit 14A. The results of the eight-bit data DA are outputted to the data bus BD.

Therefore, in case of the output of the data conversion operation circuit 15A, the data DA is the same as the data D in the normal operation mode, non-degenerate conversion is not carried out and the CPU 10A executes the data D without change substantially. Meanwhile, in the ROM test mode, the data conversion operating circuit 15A conducts logical EXCLUSIVE-OR operations for the same bit data between the eight-bit data D and the eight-bit data DT from the outside and therefore the data is non-degenerate converted into the data DA. The CPU 10A executes the data DA as a result of the conversion, as a command code. The non-degenerate conversion according to the present invention should not be limited to the logical EXCLUSIVE-OR operation. However, with the logical EXCLUSIVE-OR operation, it is possible to conduct the non-degenerate conversion by using a small number of logical gates. The data DT from the outside for use in the non-degenerate conversion may be fixed to a constant value or may be varied according to clocks when data is read from the ROM 12A.

The output port circuit 18A has predetermined addressees in an address area of the CPU 10A. If the CPU 10A writes data to these addresses, the data can be outputted as data TU to the outside of the MCU.

Now, assuming that the CPU 10A is equivalent to "Z80" manufactured by Zylog Co. Ltd., operations in the ROM test mode in this embodiment will be specifically described. This is applicable to a CPU having a different command code set, as well.

Concrete examples of operations mentioned herein will be shown in the table 1 given below. In the table, a reference symbol B1 denotes a command execution cycle of the CPU 10A. In a total of 32768 cycles, write data denoted by reference symbol B3 are sequentially read and subjected to program-processing from addresses 0000 to 7FFF on the hexadecimal notation scale of the ROM 12A as shown by reference symbols B2 and B3 in this example.

Shortly after reset, data in address 0000 is executed. In this example, the data inputted from the outside as test conversion data DT in the test mode is denoted by a reference symbol B4. The CPU command actually executed by the CPU 10A after non-degenerate converted in the data conversion operating circuit 15A in the ROM test mode is denoted by a reference symbol B5 and the command code of the CPU command is denoted by a reference symbol B6. Therefore, in the ROM test mode, the reference symbol B6 corresponds to the data DA shown in FIG. 2.

TABLE 1

| B1 Cycle | B2 ROM address | B3 ROM content | B4 Test conversion data | B5 CPU command | B6 Command code |
|---|---|---|---|---|---|
| 1 | 0000 | 31 | 31 | NOP | 00 |
| 2 | 0001 | 0F | 0F | NOP | 00 |
| ... | ... | ... | ... | ... | ... |
| ... | ... | ... | ... | ... | ... |
| 32763 | 7FFA | 2C | 2C | NOP | 00 |
| 32764 | 7FFB | AC | AC | NOP | 00 |
| 32765 | 7FFC | DD | E3 | LDA | 3E |
| 32766 | 7FFD | 81 | 80 | Data: 01 | 01 |
| 32767 | 7FFE | 1F | CC | OUT A | D3 |
| 32768 | 7FFF | 6C | 2C | Address: 40 | 40 |

Here, it is assumed that the ROM address of the reference symbol B2, the content of the ROM of the reference symbol B3, the test conversion data of the reference symbol B4, the CPU command of the reference symbol B5 and the command code of the reference symbol B6 in the n-th cycle of the reference symbol B1 are expressed as B2(n), B3(n), B4(n), B5(n) and B6(n), respectively. In the MCU in this embodiment, written data denoted by the reference symbol B3 is set to realize a certain function and is written into the ROM 12A. This written data is subjected to the ROM test. It has to be normally unrevealed and prevented from being wrongfully read.

In the example shown in the table, CPU commands denoted by a reference symbol B5 are programmed to be only "NOP" from cycle 1 to cycle 32764 in the ROM test mode. Here, "NOP" means "No Operation" which is a command with no essential operation. From cycle 32765 to cycle 32768, CPU commands are programmed to obtain an output TU notifying the normal end from the output port circuit 18A. The program is designed to output "01" on the hexadecimal notation system to the output port of the output port circuit 18A in address 40 on the hexadecimal notation system. The reference symbol B6 denotes a command code for the CPU command denoted by the reference B5. Therefore, if the content of the ROM denoted by the reference symbol B3 is known and the command code denoted by the reference symbol B6 and to be executed by the CPU 10A is determined, the test conversion data DT of B6 to be inputted from the outside can be obtained by the following formula:

$$B4(n)=B3(n) \cdot XOR \cdot B6(n) \qquad (1)$$

Additionally, when a test is actually conducted in the test mode, an EXCLUSIVE-OR logical operation is conducted between the data D read from the ROM 12A and the data DTA identical with the test conversion data DT inputted from the outside as shown by the following formula; non-degenerate conversion is conducted and then the data DA of the command code executed by the CPU 10A is generated.

$$B6(n)=B3(n) \cdot XOR \cdot B4(n) \qquad (2)$$

In the example described above, from cycle 1 to cycle 32764 denoted by the reference symbol B1, only the programs for the CPU command of "NOP" are executed. From cycle 32765 to cycle 32768, the programs for outputting "01" to the output port are executed. Therefore, if written data in the ROM 12A is abnormal, the operation of the CPU 10A becomes different from an expected one from the cycle 1 to cycle 32768 and the CPU 10A malfunctions, with the result that "01" is not outputted from the output port circuit 18A. Accordingly, the judgment of whether or not the data is defective in the ROM test is made by observing whether or not the output data TU is "01" to thereby observe the operation of the CPU 10A.

As can be seen from the above, in this embodiment, it is possible to conduct a ROM test by applying the present invention. It is possible to test, no matter when, internal state including the content of the data written in the ROM of the one chip micro-computer which is the very target of the present invention only by adding relatively simple circuits while preventing any third party from wrongfully reading the written data.

There are some cases where it is insufficient to execute a command of "NOP" many times as shown in the above example and where observation from the outside cannot be made even if something happens to the CPU. In such cases, a more complex program for the CPU command may be executed. This includes, for example, (i) calculating the inspection codes of the content of the installed ROM and outputting the result; (ii) outputting the content of the installed ROM on a one byte-by-one byte basis; and (iii) reading the installed ROM a plurality of times and, only when they coincide, outputting the results showing that no defective data exists. In any case, the program to be executed by the CPU 10A can be set from the outside by using the test conversion data DT and can provide an extremely high degree of freedom. Furthermore, the test conversion data DT inputted from the outside in the test mode depends on the written data of the ROM 12A. Due to this, a third party without the knowledge of the written data cannot even conduct a ROM test and cannot at all wrongfully read the written data in the ROM 12A even if such a test method is disclosed.

Here, a case where a ROM test program is written directly to a RAM installed in the MCU not through the CPU 10A, but through serial port and the like, and is executed by the MCU can be compared with the present invention. However, with a function of capable of executing the program written in the installed RAM as described above, it is possible to write programs other than that for the ROM test from the outside and execute them. Therefore, it may be possible, for example, to write and execute a program for searching various secret information such as a program for wrongfully reading the written data in the installed ROM. The comparison example has, thus, a fatal disadvantage in terms of security within the MCU.

In the embodiment according to the present invention, by contrast, it is required to execute at least 5 to 10-byte commands to read the content of the installed ROM to the output port or the like. Due to this, even if the test conversion data DT is inputted from the outside by the method of trial and error, it is virtually impossible to wrongfully read the written data. In particular, it is possible to make it difficult to wrongfully read the written data based on an estimation by taking account of a command code sentence placed in the vicinity of an execution start address or, in the above example, address 0 after releasing reset, that is, placing a command different from that normally executed therein. In many cases, after releasing reset, a command for initializing a stack pointer is normally placed in the vicinity of the execution start address. However, to prevent the third party estimation mentioned above, another command or, in some cases, a program of no special value may be placed therein in purpose and thereafter an initialization command which is actually needed may be placed.

Figure 5:
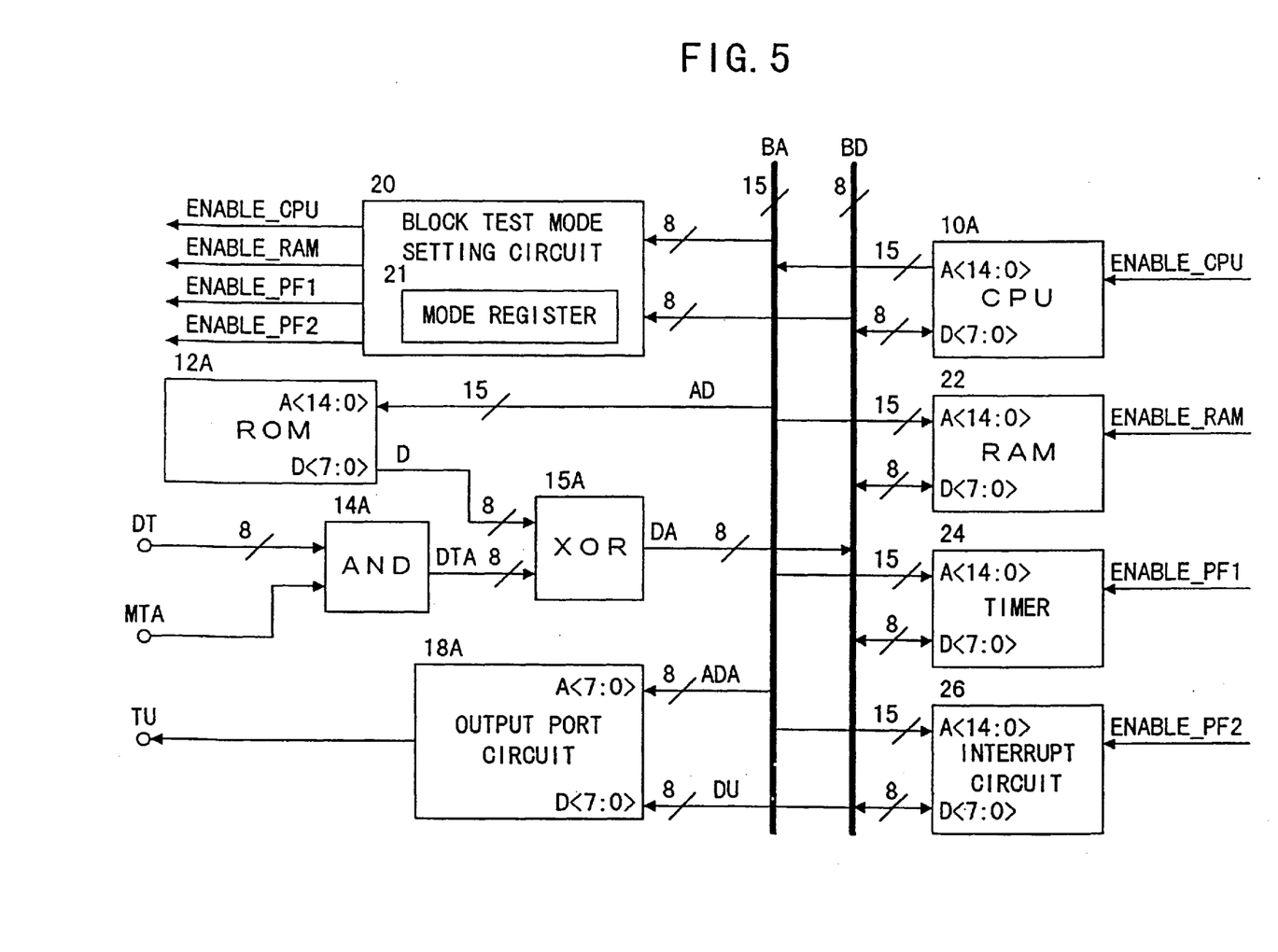
FIG. 5 is a block diagram showing the structure of the second embodiment of the MCU to which the present invention is applied.

FIG. 5 is a block diagram showing the structure of the second embodiment of the MCU to which the present invention is applied.

As shown in FIG. 5, the MCU is provided with a RAM 22, a timer 24 and an interrupt circuit 26 in addition to the MCU of the first embodiment. The MCU is further provided with a block test mode setting circuit 20. This block test mode setting circuit 20 individually controls valid or invalid of operation of the CPU 10A, the RAM 22, the timer 24 and the interrupt circuit 26.

In this embodiment, predetermined data can be written (or downloaded) into desired address of the RAM 22 by the data DT from the outside of the MCU according to the present invention. The program thus downloaded into the RAM 22 can perform various operations. Downloading of the program (hereinafter referred to as "external program downloading") is one embodiment of the present invention.

According to the above external program downloading, tests of the RAM 22, the ROM 12A and peripheral functions of the timer 24 and the interrupt circuit 26 and the like, are possible. If a program to conduct detailed read/write test of internal RAM is transferred, reliability of RAM is fairly approved.

When MCU conducts various tests according to the first embodiment, test terminal (input terminal of conversion data DT) for inputting instruction signal is necessary to conduct various tests in the MCU. However, according to the above external program downloading, no terminal for inputting signal is necessary during conducting a test program after completing the downloading and many kinds or modes of test can be set. Further, a special test operation mode can be set to the MCU itself by the above external program downloading. For example, a program to set the special test operation mode can be written into the RAM.

The block test mode setting circuit 20 in FIG. 5 can set outputs of signals ENABLE-CPU, ENABLE-RAM, ENABLE-PF1 and ENABLE-PF2 for setting operation status valid or invalid, to "1" or "0" independently, according to data written in the internal mode register 21. These signals ENABLE-CPU, ENABLE-RAM, ENABLE-PF1 and ENABLE-PF2 are inputted to the CPU 10A, RAM 22, timer 24 and interrupt circuit 26, respectively. When input signal is "1", operation of them are set valid, and when input signal is "0", operation of them are set invalid, respectively. According to these setting methods of operation, special mode setting as stopping the operation of the CPU 10A can be made by software without using set pin for outside of MCU.

Figure 6:
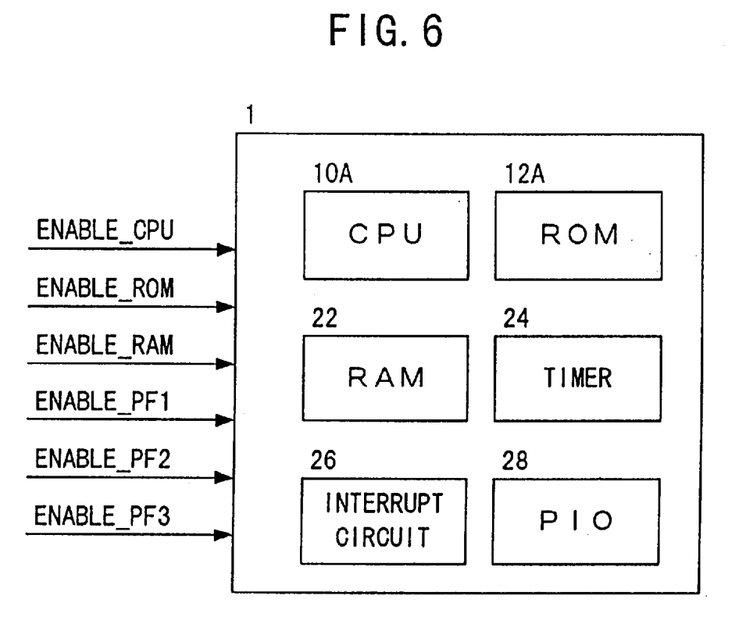
FIG. 6 is a block diagram showing conventional MCU provided with a mode setting terminal.

Therefore, the signal ENABLE-CPU for the CPU 10A, the signal ENABLE-ROM for the ROM 12A, the signal ENABLE-RAM for the RAM 22, the signal ENABLE-PF1 for the timer 24, the signal ENABLE-PF2 for the interrupt circuit 26 and signal ENABLE-PF3 for PIO (Parallel Input Output) 28 for setting operation status valid or invalid, which are conventionally inputted through terminal of MCU 1 as shown FIG. 6, can be set by software using the program downloaded by the external program downloading.

Figure 7:
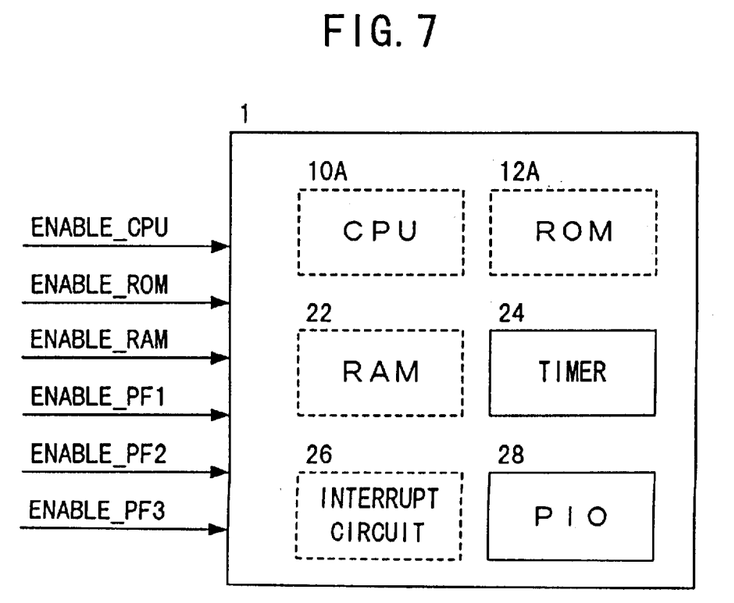
FIG. 7 a first block diagram showing the above conventional MCU.

In FIG. 7, only the signals ENABLE-PF1 and ENABLE-PF3 are set to "1". Therefore, operation of only the timer 24 and the PIO 28 are set valid.

Figure 8:
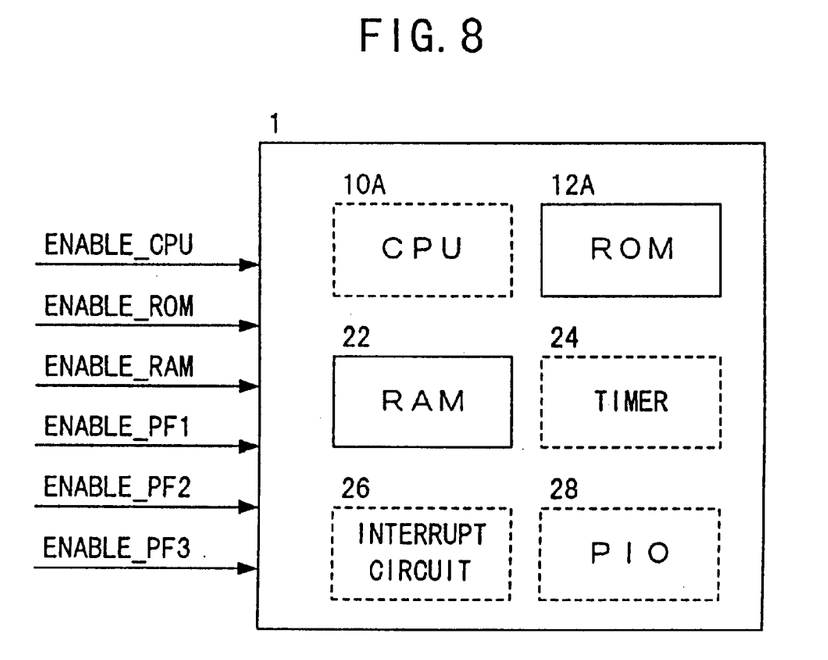
FIG. 8 a is a second block diagram showing the above conventional MCU.

In FIG. 8, only the signals ENABLE-ROM and ENABLE-RAM are set to "1". Therefore, operation of only the ROM 12A and the RAM 22 are set valid.

As described above, valid or invalid setting of operation can be made by the program downloaded by the external program downloading. In FIGS. 7 and 8, CPU 10A and the like in operation status are shown by solid lines, and those in non-operation status are shown by broken lines.

Further, any program to conduct processing or computing can be set freely to the CPU 10A installed within the MCU. In addition to such a versatility, there is a great advantage that no person, who does not know the content of the ROM 12A to which command code executed by the CPU 10A is written, can utilize such a function. The content of the ROM 12A, which functions as coding key, has essentially many digits. Therefore, high security can be obtained and the third party cannot use it wrongfully.

In the case program is downloaded by the data DT from outside of the MCU according to the present invention, each program code of the program is inputted to and executed by the CPU 10A at each time when it is downloaded by a program code unit. Therefore, a circuit for incorporating the data DT, the test mode setting circuit 14A and the data conversion operating circuit 15A are always used when the CPU 10A executes the program.

In contrast thereto, in the case of the external program downloading, the CPU 10A executes the program stored in the RAM 22, so that the circuit for incorporating the data DT, the test mode setting circuit 14A and the data conversion operating circuit 15A are not used. Therefore, they can be tested by the program.

For example, the external program downloading can be conducted by the 5 step program as shown in Table 2. By this program, plural data can be written into the RAM 22 from outside of the MCU. Here, "xx" in the third step is a data written into the RAM 22. Steps from the third step to the fifth step are executed 200 times in all. Therefore, the data "xx" is converted and the converted data is written into the RAM 22 from outside of the MCU at each execution. So, many data can be written. Each data may be command code and constitute a program in all.

TABLE 2

| RELATIVE ADDRESS | DATA | LABEL | MNEMONIC CODE | |
|---|---|---|---|---|
| 0000 | 21 00 F0 | | LD | HL, 0F000h |
| 0003 | 06 C8 | | LD | B, 200 |
| 0005 | 36 xx | LP1 | LD | (HL), xx |
| 0007 | 23 | | INC | HL |
| 0008 | 10 FB | | DJNZ | LP1 |

The data D read from the ROM 12A during execution of the above program are shown in a dump list in Table 3.

[Table 3]

+0+1+2+3+4+5+6+7+8+9+A+B+C+D+E+F 0000 F3 31
EF FF ED 5E CD B5 03 CD E3 05 C3 00 01 F5

The data DT to be inputted from outside of the MCU during execution of the program to execute the 5 step program are shown in the following Table 4.

TABLE 4

| B1 cycle | B2 ROM address | B3 ROM content | B4 Test conversion data | B6 Command code |
|---|---|---|---|---|
| 1 | 0000 | F3 | D2 | 21 |
| 2 | 0001 | 31 | 31 | 00 |
| 3 | 0002 | EF | 1F | F0 |
| 4 | 0003 | FF | F9 | 06 |
| 5 | 0004 | ED | 25 | C8 |
| 6 | 0005 | 5E | 68 | 36 |
| 7 | 0006 | CD | xx | yy |
| 8 | 0007 | B5 | 96 | 23 |
| 9 | 0008 | 03 | 13 | 10 |
| 10 | 0009 | CD | 36 | FB |
| 11 | (idle) | | | |
| 12 | 0005 | 5E | 68 | 36 |
| 13 | 0006 | CD | xx | yy |
| 14 | 0007 | B5 | 96 | 23 |
| 15 | 0008 | 03 | 13 | 10 |
| 16 | 0009 | CD | 36 | FB |
| 17 | (idle) | | | |
| 18 | 0005 | 5E | 68 | 36 |
| 19 | 0006 | CD | xx | yy |
| 20 | 0007 | B5 | 96 | 23 |
| 21 | 0008 | 03 | 13 | 10 |
| 22 | 0009 | CD | 36 | FB |
| 23 | (idle) | | | |
| 24 | 0005 | 5E | 68 | 36 |
| 25 | 0006 | CD | xx | yy |
| 26 | 0007 | B5 | 96 | 23 |
| 27 | 0008 | 03 | 13 | 10 |
| 28 | 0009 | CD | 36 | FB |

In the above example, there occurs idle cycle of one cycle at a process of executing jumping judgment command "DJNZ". The CPU 10A does not fetch command at the idle cycle. Therefore, some countermeasure like setting dummy data as the data DT at the idle cycle should be taken.

The test conversion data which is given as the data DT may be given referring to address value of the address bus BA when the address bus BA is output to outside of the MCU.

On the other hand, if the address bus BA is not output, the data DT may be given sequentially based on address of execution command of each cycle determined previously by simulation and the like.

In this case, the data should be given sequentially taking into account the situation that cycle number necessary for executing each command may be different and idle cycle may be included. This situation is also applied to Z80, CPU interchangeable with Z80, and the other CPU.

Now, testing method like the second embodiment of the circuit for incorporating the data DT, the test mode setting circuit 14A and the data conversion operating circuit 15A in the MCU which does not include the RAM 22 as in the first embodiment is thought.

The MCU which does not include the RAM, the RAM may be provided externally to the MCU almost without exception. For example, data bus for externally providing the RAM is extracted to outside by a terminal and the like. Therefore, route and the like for incorporating the data DT may be formed by utilizing the data bus without providing new terminal. Further, normal circuit for incorporating the data DT, the test mode setting circuit 14A and the data conversion operating circuit 15A may be tested by utilizing the above route for incorporating the data DT.

In this case, program is not transferred to the internal RAM by the external program downloading. Namely, data read from the ROM 12A is non-degenerate converted by the data DT inputted through the above data bus without providing new terminal, and command code to be executed by the CPU 10A is obtained.

By the way, the non-degenerate conversion of the present invention does not limited to the logical EXCLUSIVE-OR operation. For example, a logical EXCLUSIVE-NOR operation or binary sum operation may be used. In the binary sum operation, carry by overflow should be neglected.

Further, p bits data output from ROM to be non-degenerately converted may be divided into plural groups, and different non-degenerate conversion with regard to different group may be conducted. Namely, each group may be differently and non-degenerately converted by the logical EXCLUSIVE-OR operation, the logical EXCLUSIVE-NOR operation, the binary sum operation and the like.

Furthermore, p bits data output from ROM to be non-degenerately converted or q bits data inputted from outside for non-degenerate conversion may be replaced mutually in the non-degenerate conversion. For example, when the non-degenerate conversion is conducted by operation such as the logical EXCLUSIVE-OR operation or the logical EXCLUSIVE-NOR operation, the operation is not limited to one between the same bit positions, but the operation between different bit positions may be conducted.

Figure 9:
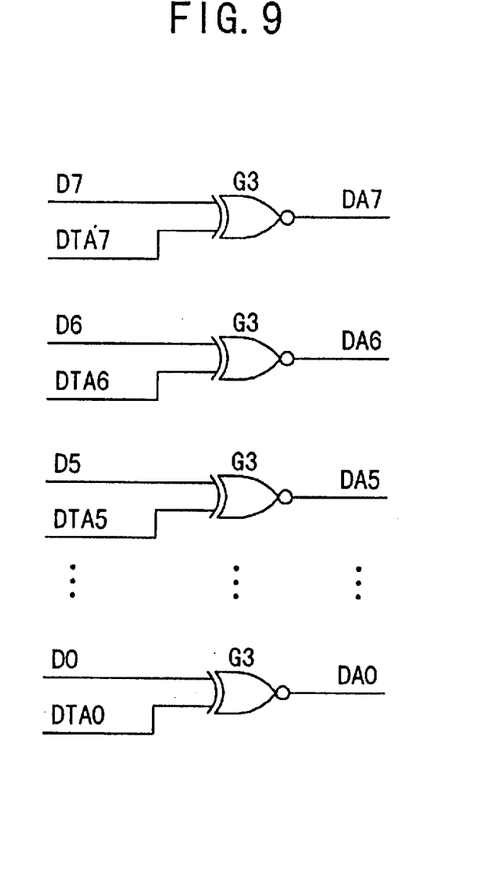
FIG. 9 is a circuit diagram of second example of the data conversion operation circuit used in the embodiment.
Figure 10:
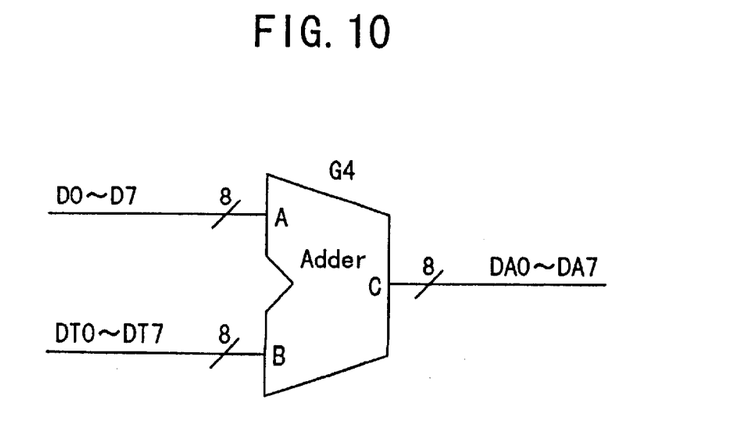
FIG. 10 is a circuit diagram of third example of the data conversion operation circuit used in the embodiment.
Figure 11:
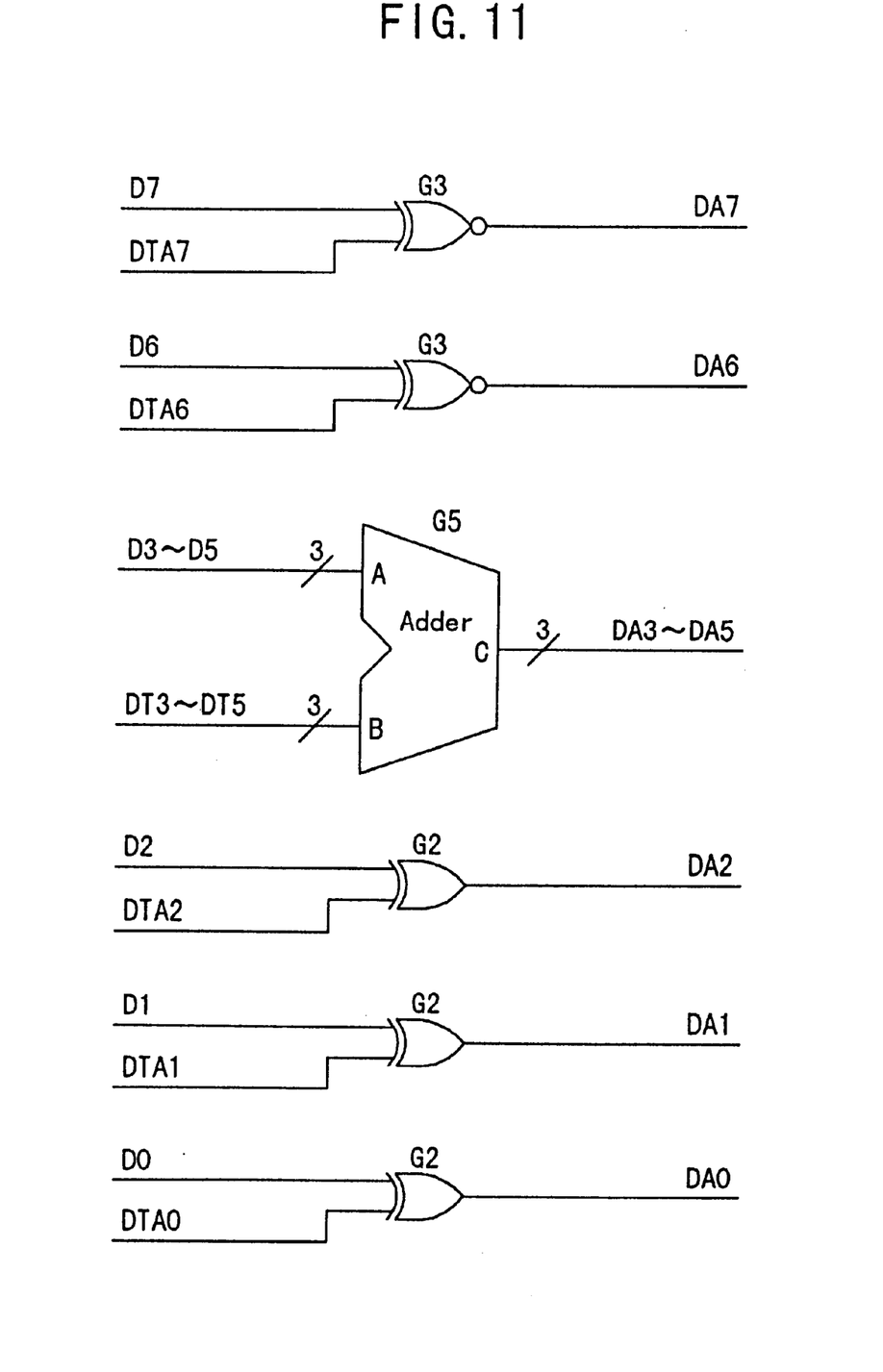
FIG. 11 is a circuit diagram of forth example of the data conversion operation circuit used in the embodiment.
Figure 12:
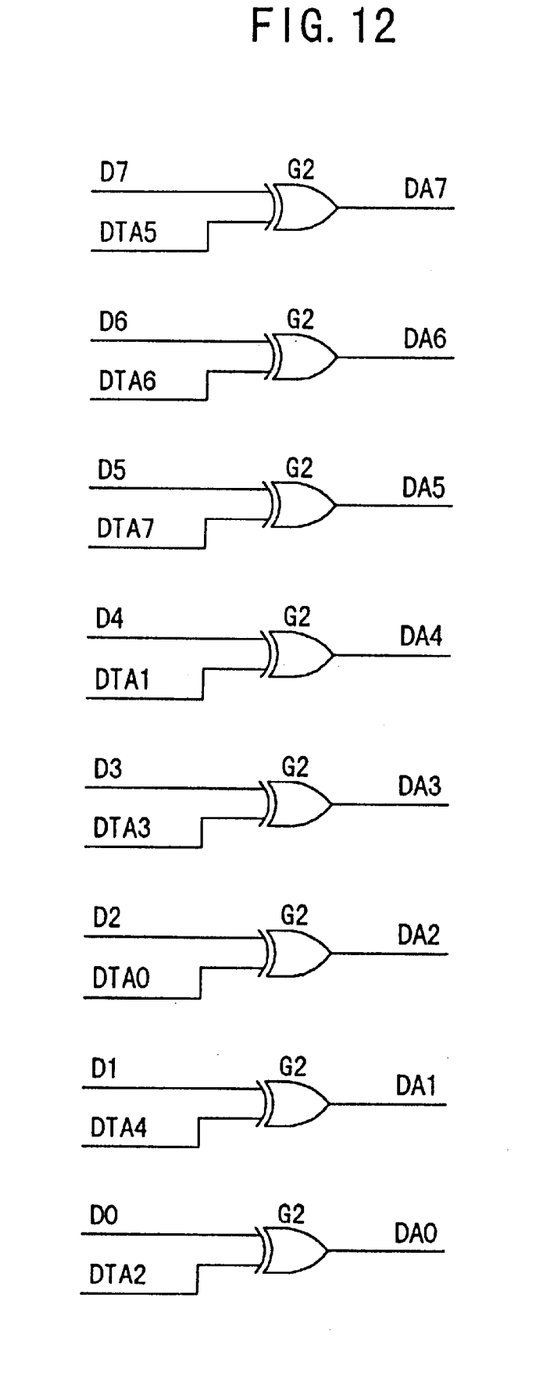
FIG. 12 is a circuit diagram of fifth example of the data conversion operation circuit used in the embodiment.

Further, the data conversion operating circuit 15A in the first and second embodiments for conducting the non-degenerate conversion is not limited to the logical EXCLUSIVE-OR gate G2 as shown in FIG. 4, but a logical EXCLUSIVE-NOR gate G3 as shown in FIG. 9 may be used. Or, a binary adder G4 as shown in FIG. 10, a logical EXCLUSIVE-OR gate G2, a logical EXCLUSIVE-NOR gate G3 and a binary adder G5 as shown in FIG. 11 may be used. Or, the logical EXCLUSIVE-OR operation may be conducted between different bits as shown in FIG. 12.

Although only a limited number of the embodiments of the present invention have been described, it should be understood that the present invention is not limited thereto, and various modifications and variations can be made without departing from the spirit and scope of the invention defined in the accompanying claims.

What is claimed is:

1. Test method of one chip micro-computer for testing internal state of one chip micro-computer having at least a CPU and a ROM installed in a single package, the ROM connected to the CPU, data written in the ROM capable of being executed by the CPU as a command code, said method comprising the steps of:

setting a test mode for testing secret data written in the ROM;

executing a command code non-degenerately converted from the secret data by test conversion data inputted from outside of said package when reading said command code from said ROM and executing said command code by said CPU in the test mode; and detecting a CPU execution state from the outside of said package to thereby conduct said test of secret data written in the ROM.

2. One chip micro-computer having at least a CPU and a ROM installed in a single package, said ROM connected to the CPU, data written in the ROM capable of being executed by the CPU as a command code, said one chip micro-computer comprising:

a test mode setting circuit for setting a test mode for testing secret data written in the ROM;

a conversion data input terminal for inputting test conversion data from outside of said package;

a data conversion operating circuit for non-degenerate converting said secret data to the command code using said test conversion data when said test mode has been set and said command code is read from said ROM and executed by said CPU; and execution state detection means for detecting an execution state of the CPU executing a non-degenerately converted command code outputted from the data conversion operating circuit, wherein said test of secret data written in the ROM is conducted by detecting the CPU execution state.

3. One chip micro-computer according to claim 2, wherein said data conversion operating circuit includes a circuit for non-degenerate converting said secret data to said command code by conducting an EXCLUSION-OR operation between said secret data and said test conversion data.

4. Test method of one chip micro-computer for testing internal state of one chip micro-computer having at least a CPU and a ROM installed in a single package, the ROM connected to the CPU, data written in the ROM capable of being executed by the CPU as a command code, said method comprising the steps of:

setting a test mode for testing the internal state from outside of the one chip micro-computer;

setting a block test mode for determining valid or invalid of operation of at least said CPU according to setting data in a mode register written by a program executed by the CPU; and operating said CPU to write desired setting data into the mode register, by a program of command code non-degenerately converted by data inputted from outside of package, when the test mode is set, said command code is read out of said ROM and executed by said CPU;

whereby valid or invalid of partial operation of the one chip micro-computer is set.

5. One chip micro-computer having at least a CPU and a ROM installed in a single package, said ROM connected to the CPU, data written in the ROM capable of being executed by the CPU as a command code, said one chip micro-computer comprising:

a block test mode setting circuit with a mode register, for setting valid or invalid of operation of at least said CPU according to setting data in the mode register written by a program executed by the CPU;

a test mode setting circuit for setting a test mode from outside of the one chip micro-computer;

a conversion data input terminal for inputting test conversion data from outside of said package; and a data conversion operating circuit for non-degenerate converting the command code using said test conversion data when said test mode has been set and said command code is read from said ROM and executed by said CPU, wherein said CPU writes the setting data into the mode register by a program of the command code non-degenerate converted, and valid or invalid of partial operation of the one chip micro-computer is set.

* * * * *